United States Patent Office 2,794,009
Patented May 28, 1957

2,794,009

USE OF ORGANIC SULFONIC ACIDS TO ACCELERATE THE VULCANIZATION OF BUTYL RUBBER WITH DIMETHYLOL PHENOLS

Paul F. Gunberg, Ridgewood, N. J., assignor to United States Rubber Company, New York, N. Y., a corporation of New Jersey No Drawing. Application October 12, 1953,
Serial No. 385,689

11 Claims. (Cl. 260—33.6)

This invention relates to a process for promoting the reactions of Butyl rubber with dimethylol phenols, as well as to the reaction products obtained thereby.

A copending application of Tawney and Little, Serial No. 266,146, filed January 12, 1952, now Patent No. 2,701,895, discloses and claims the vulcanization of Butyl rubber with dimethylol phenols. It has been desired to render the vulcanization of Butyl rubber with dimethylol phenols more convenient and more economical, by reducing the time and temperature necessary to attain a practical cure by this method. Accordingly, one of the principal objects of the present invention is to provide a method of accelerating the aforesaid vulcanization process.

Another object of this invention is to provide a method of accelerating those reactions of Butyl rubber with dimethylol phenols in which only a partial degree of cure is effected to be followed by subsequent vulcanization with other vulcanizing agents.

Another object is to provide a method of accelerating the high-temperature reaction between Butyl rubber, dimethylol phenols and carbon black whereby, upon subsequent compounding and curing, vulcanizates are obtained having abnormally high electrical resistively and low torsional hysteresis.

I have now discovered that the vulcanization of Butyl rubber with dimethylol phenols is greatly accelerated by the presence of a small amount of an organic sulfonic acid, and excellent cures can be obtained in a considerably shorter time, or at a lower temperature, than would otherwise be possible. A remarkable feature of the use of an organosulfonic acid to accelerate the dimethylol phenol cure of Butyl rubber is that, although the cure proceeds rapidly, there is no difficulty from reversion and consequent loss of physical properties if the curing conditions are unduly prolonged or severe. This resistance to reversion, characteristic of the vulcanizates of the invention, renders the present improved vulcanizates particularly well adapted for use in such articles as curing bags, that are exposed in service to temperatures that would ordinarily cause over-cure in conventional rubber stocks.

Butyl rubber, as is well known, is a commercial synthetic rubber made by copolymerizing an isoolefin, usually isobutylene, with a minor proportion of a conjugated diolefin having from 4 to 14 carbon atoms per molecule. The isoolefins used generally have from 4 to 7 carbon atoms, and such isomonoolefins as isobutylene or ethyl methyl ethylene are preferred. The diolefin usually is one having from 4 to 6 carbon atoms, and is preferably isoprene or butadiene. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubbers.

In accordance with the invention, the Butyl rubber to be vulcanized is compounded with a dimethylol phenol, as curing agent, and an organosulfonic acid as the accelerator. The dimethylol phenol curing agents are known materials, and are typically made by reacting a para-substituted phenol having the two ortho positions unoccupied, with a considerable excess of formaldehyde, the molar ratio of formaldehyde to phenol typically being 2:1, in the presence of a strong alkaline catalyst, especially an alkali metal hydroxide. Typically the mixture of the phenol, formaldehyde and alkaline catalyst is heated at a suitable temperature, e. g., 25–100° C., whereby the formation of the methylol phenol, i. e., the para-substituted-2,6-dimethylol phenol, is effected. This material, which is a phenol dialcohol, can be isolated by acidification of the mixture and separation of the oily layer, which can then be partially polymerized to the resol stage by heating it at elevated temperature, say 75–175° C. This resol material has the advantage that it is more reactive with the Butyl rubber than is the lower molecular weight material. Isolation of the phenol dialcohol can be omitted, in which case the reaction is carried past the monomer stage to the resol stage, whereupon the mixture is neutralized and water is removed to give the resol. The resols are commercially available resins, sold under such trade names as Amberol ST–137, and they are oil-soluble and heat-reactive; i. e., capable of being converted by heat to a cured state without any necessity for adding a formaldehyde-yielding curing agent, in contrast to the novolac type of phenolic resin, which is prepared in acid medium with a deficiency of formaldehyde and is permanently fusible and soluble unless a source of formaldehyde is added to advance the cure.

The phenol from which the dimethylol phenol is made generally has a hydrocarbon group in the position para to the phenolic hydroxyl, examples being alkyl groups—especially alkyl groups having from 3 to 20 carbon atoms, of which tertiary-butyl and tt-octyl (alpha, alpha, gamma, gamma-tetramethyl-butyl) are especially preferred—cycloalkyl groups, aryl groups such as phenyl, and aralkyl groups such as benzyl and cumyl. Such inactive substituent in the para position serves to "block" this otherwise active position and prevent the formation of a trialcohol which would not serve the purposes of the invention.

Examples of suitable dimethylol phenols that can be used in the invention either in the polymeric or monomeric form are as follows:

2,6-dimethylol-4-methylphenol
2,6-dimethylol-4-t-butylphenol
2,6-dimethylol-4-tt-octylphenol
2,6-dimethylol-4-dodecylphenol
2,6-dimethylol-4-phenylphenol
2,6-dimethylol-4-benzylphenol
2,6-dimethylol-4-(alpha, alpha-dimethylbenzyl) phenol
2,6-dimethylol-4-cyclohexylphenol Any of the foregoing materials may be used either in the monomeric form, or in the polymeric, resol form. Mixtures of the resinous polymeric dimethylol phenols with more or less of low molecular weight or monomeric dimethylol phenols are also useful. The resinous dimethylol phenols are the preferred materials for use in the invention because they are more effective, and more convenient to use. For the sake of convenience and brevity, the term dimethylol phenol, or 2,6-dimethylol-4-hydrocarbon substituted phenol, will be used to refer to any of the monomeric or polymeric compounds, or to mixtures thereof, unless otherwise stated. The resol or polymeric so-called 2,6-dimethylol-4-hydrocarbon substituted phenol is of course actually a limited self-condensation polymer of the monomeric 2,6-dimethylol-4-hydrocarbon substituted phenol. Such polymer is believed to be composed largely of molecules having at each end a phenolic nucleus providing a methylol group in each terminal ortho position; and in this sense the polymer itself is also a "2,6-" dimethylol material. These terminal methylol groups render the resol polymer heat-reactive, in contrast to the novolac type of resin.

The dimethylol phenol is generally employed in amount within the range of from about 2 to 15 parts by weight to 100 parts of Butyl rubber. While smaller amounts of the dimethylol phenol may be employed, e. g., 1 part, it is usually found that less than this amount is insufficient to produce a practical cure within a reasonable time. However, if a full cure is not desired, very small amounts may be used, as will be more fully explained below. Also, larger amounts may be used, e. g., 20 parts, but amounts greater than this are without further advantage.

The amount of organosulfonic acid employed in the invention may vary considerably, but usually only a very small amount is used, since the organosulfonic acids are quite potent in their accelerating action. Thus, definite accelerating effect may be noted with as little as a few tenths of a part of the organosulfonic acid in 100 parts of Butyl rubber, although I generally use somewhat more than this, say 1 to 5 parts per 100 parts of the Butyl rubber. Although even larger amounts of the accelerator can be used, say 10 or 15 parts, it is not generally necessary or desirable to use appreciably more than about 5 parts.

In carrying out the invention, the Butyl rubber, dimethylol phenol, and organosulfonic acid, and any additional desired ingredients, may be mixed together according to the procedures ordinarily used in mixing rubber compounds, with the aid of the usual rubber mixing equipment, such as an internal mixer or roll mills. The vulcanizable mixture resulting from the foregoing ingredients may be fabricated into the desired form by the usual methods, such as calendering, extrusion, or molding, and subsequently vulcanized by heating, preferably while confined under pressure.

For the purpose of making such articles as curing bags or inner tubes, there is generally included in the mixture a quantity of a suitable reinforcing material, preferably carbon black. Although at least about 20 to 100 parts by weight of carbon black may be employed per 100 parts of the Butyl rubber, it is generally preferred to use about 40 to 80 parts of black, most preferably about 50 or 60 parts. Other compounding ingredients, such as fillers, processing aids, etc., may be included in the mixture if desired.

The curing process of the invention is conveniently carried out at temperatures of 200° F. or higher, and preferably at temperatures in excess of 300° F., for periods of time ranging from about 5 minutes to 3 hours, the lower the temperature the longer the curing time, and vice versa, within the stated ranges. Elastic products having the properties of typical vulcanized rubbery materials are obtained. The most preferred vulcanizing temperatures are within the range of about 320° to 370° F., although somewhat higher temperatures may be employed, e. g., 390° or 400° F., provided that such highly elevated temperatures are not maintained for a sufficiently long time to cause thermal injury to the article.

The following examples will serve to illustrate the invention in more detail. In the examples, the amounts of the various ingredients are all expressed in parts by weight.

EXAMPLE I

Two stocks were made up by mixing the materials shown in the table below in the stated amounts, one of the stocks containing an organosulfonic acid, viz., p-toluenesulfonic acid, and the other stock containing no organosulfonic acid. Portions of the stocks were cured for the times and temperatures indicated in the table, and the properties of the resulting vulcanizates were then measured, with the results noted in the table. The GRI–25 was a commercial grade of synthetic rubber made by copolymerizing isobutylene and isoprene. The Amberol ST–137 was a commercial phenolic resin of the dimethylol phenol class, and it is believed to be made from about 1 mol of p-tt-octyl phenol, 2 mols of formaldehyde and 1 mol of sodium hydroxide, the alkali being carefully neutralized after the condensation is complete.

Table I

|  |  | I-A | I-B |
|---|---|---|---|
| GRI-25 |  | 100 | 100 |
| Carbon black |  | 70 | 70 |
| Stearic acid |  | 2 | 2 |
| Light mineral oil |  | 8 | 8 |
| Amberol ST-137 |  | 8 | 8 |
| p-Toluenesulfonic acid |  | 2 | -------- |
| Temperature of cure ° F |  | 315 | 330 |
|  | Time of cure, minutes |  |  |
| Scott Tensile | 30 | 1,100 | 550 |
|  | 60 | 1,190 | 1,020 |
|  | 120 | 1,230 | 1,230 |
| Elongation at break | 30 | 430 | 820 |
|  | 60 | 410 | 590 |
|  | 120 | 400 | 480 |
| Modulus at 300%, Elongation | 30 | 500 | 200 |
|  | 60 | 650 | 440 |
|  | 120 | 690 | 700 |

It will be noted that the addition of a small amount of p-toluenesulfonic acid in stock I–A not only accelerated the rate of the cure but also allowed the cure to be made at a lower temperature: by the use of p-toluenesulfonic acid as accelerator, a good technical cure was obtained in 30 minutes at 315° F., whereas the unaccelerated stock I–B required 60–120 minutes at 330° F. to realize the same degree of cure. The vulcanizate made from the accelerated stock exhibited unusual resistance to thermal reversion as well as resistance to cold flow. This was demonstrated by the fact that on continued cure the vulcanizate containing the accelerator did not revert, as do over-cured sulfur vulcanizates. This allows considerable tolerance in curing conditions and also illustrates the remarkable aging characteristics of the improved vulcanizates.

EXAMPLE II

Table II represents the results obtained by carrying out an experiment similar to Example I, and using both aliphatic and aromatic sulfonic acids as accelerators.

Table II

|  |  | II-A | II-B | II-C | II-D |
|---|---|---|---|---|---|
| GRI-15 |  | 100 | 100 | 100 | 100 |
| Carbon black |  | 70 | 70 | 70 | 70 |
| Amberol ST-137 |  | 6 | 6 | 6 | 6 |
| p-Toluenesulfonic acid |  | -------- | 2 | -------- | -------- |
| Beta-Napthalene-sulfonic acid |  | -------- | -------- | 2 | -------- |
| Mixed alkanesulfonic acids [1] |  | -------- | -------- | -------- | 2 |
|  | Time of cure at 330° F., minutes | A | B | C | D |
| Scott Tensile | 15 | 170 | 940 | 640 | 1,170 |
|  | 30 | 420 | 990 | 690 | 1,220 |
|  | 60 | 740 | 1,030 | 720 | 1,240 |
|  | 120 | 920 | 1,100 | 750 | 1,180 |
|  | 240 | 1,120 | 1,030 | 780 | 1,170 |
| Elongation at break | 15 | 690 | 450 | 500 | 310 |
|  | 30 | 590 | 420 | 490 | 320 |
|  | 60 | 510 | 410 | 480 | 310 |
|  | 120 | 460 | 420 | 470 | 300 |
|  | 240 | 400 | 390 | 420 | 290 |
| Modulus at 300% elongation | 15 | 110 | 550 | 320 | 880 |
|  | 30 | 260 | 570 | 350 | 900 |
|  | 60 | 480 | 570 | 370 | 900 |
|  | 120 | 690 | 630 | 400 | 980 |
|  | 240 | 850 | 670 | 400 | -------- |

[1] Mixed alkanesulfonic acids—a mixture containing equal parts of methane-, ethane-, and propanesulfonic acids.

It will be noted from Table II that when the mixed alkanesulfonic acids were used for acceleration, the 15-minute cure was equivalent to a 4-hour unaccelerated cure. Again, it should be observed that prolonged overcure does not cause rapid reversion, as it does with sulfur-cured systems.

EXAMPLE III

In this example the use of organosulfonic acids to speed up the curing reaction of Butyl rubber with monomeric or polymeric dimethylol phenols is illustrated. In general, monomeric dimethylol phenols cure Butyl rubber at a rather slow rate. However, with acceleration, the cure with monomeric dimethylol phenols assumes practical importance.

EXAMPLE IV

This example is included merely to show that the ability to accelerate dimethylol phenol cures of Butyl rubber is not characteristic of all strong acids, but is limited to the organosulfonic acids. In Table IV are compared various strong acids as to their ability at accelerating the cure. It is evident from these data that the organosulfonic acids display a unique behavior not exhibited by any of the other acids, in that none of the latter cause any acceleration of the cure.

*Table IV*

|  |  | IV-A | IV-B | IV-C | IV-D | IV-E | IV-F | IV-G | IV-H |
|---|---|---|---|---|---|---|---|---|---|
| GRI-15 | | 100 | 100 | 100 | 100 | 100 | 100 | 100 | 100 |
| Carbon black | | 70 | 70 | 70 | 70 | 70 | 70 | 70 | 70 |
| Light mineral oil | | 8 | 8 | 8 | 8 | 8 | 8 | 8 | 8 |
| Amberol ST-137 | | 8 | 8 | 8 | 8 | 8 | 8 | 8 | 8 |
| Mixed alkanesulfonic acids | | | 1 | | | | | | |
| Benzoic acid | | | | 1 | | | | | |
| Acetic acid | | | | | 1 | | | | |
| Trichloroacetic acid | | | | | | 1 | | | |
| Phosphoric acid | | | | | | | 1 | | |
| Sulfuric acid | | | | | | | | 1 | |
| Hydrochloric acid | | | | | | | | | 1 |
|  | Time of cure at 330° F., minutes | | | | | | | | |
| Scott Tensile | 15 | 140 | 1,320 | 140 | 220 | | 280 | 470 | 270 |
|  | 30 | 620 | 1,270 | 530 | 620 | 390 | 660 | 550 | 760 |
|  | 60 | 950 | 1,320 | 940 | 1,000 | 760 | 880 | 630 | 1,040 |
|  | 240 | 1,380 | 1,330 | 1,340 | 1,350 | 1,110 | 1,140 | 670 | 1,350 |
| Elongation at break | 15 | 960 | 410 | 1,250 | 1,020 | | 770 | 580 | 930 |
|  | 30 | 760 | 420 | 830 | 720 | 580 | 720 | 570 | 670 |
|  | 60 | 600 | 400 | 620 | 590 | 560 | 600 | 550 | 560 |
|  | 240 | 430 | 390 | 410 | 430 | 420 | 500 | 540 | 430 |
| Modulus at 300% elongation | 15 | 100 | 880 | 70 | 90 | | 140 | 320 | 130 |
|  | 30 | 270 | 910 | 190 | 250 | 180 | 300 | 330 | 350 |
|  | 60 | 460 | 930 | 430 | 500 | 390 | 470 | 360 | 590 |
|  | 240 | 950 | 1,070 | 920 | 930 | 800 | 670 | 380 | 950 |

The accelerating effect of the organosulfonic acids on the reaction of dimethylol phenols with Butyl rubber can be taken advantage of also in processes where it is desired to effect only a limited or partial cure of the Butyl

*Table III*

|  |  | III-A | III-B | III-C | III-D | III-E | III-F |
|---|---|---|---|---|---|---|---|
| GRI-15 | | 100 | 100 | 100 | 100 | 100 | 100 |
| Carbon black | | 70 | 70 | 70 | 70 | 70 | 70 |
| 2,6-dimethylol-4-p-t-butyl phenol-Monomer | | 6 | 6 | | | | |
| 2,6-dimethylol-4-p-t-butyl phenol-Polymer | | | | 6 | 6 | | |
| Amberol ST-137 | | | | | | 6 | 6 |
| Mixed alkanesulfonic acids | | | 2 | | 2 | | 2 |
|  | Time of cure at 330° F., minutes | | | | | | |
| Scott Tensile | 15 | 120 | 750 | 320 | 920 | 170 | 1,170 |
|  | 30 | 150 | 840 | 670 | 1,010 | 420 | 1,220 |
|  | 60 | 360 | 870 | 1,070 | 1,090 | 740 | 1,240 |
|  | 120 | 630 | 980 | 1,310 | 1,150 | 920 | 1,180 |
|  | 240 | 920 | 1,030 | 1,410 | 1,190 | 1,120 | 1,170 |
| Elongation at break | 15 | 460 | 400 | 580 | 380 | 690 | 310 |
|  | 30 | 460 | 390 | 510 | 370 | 590 | 320 |
|  | 60 | 480 | 330 | 430 | 360 | 510 | 310 |
|  | 120 | 420 | 350 | 360 | 350 | 460 | 300 |
|  | 240 | 390 | 310 | 280 | 340 | 400 | 290 |
| Modulus at 300% Elongation | 15 | 30 | 480 | 200 | 720 | 110 | 880 |
|  | 30 | 130 | 580 | 400 | 790 | 260 | 900 |
|  | 60 | 250 | 660 | 830 | 850 | 480 | 900 |
|  | 120 | 470 | 660 | 1,110 | 930 | 690 | 980 |
|  | 240 | 730 | 790 | | 970 | 850 | | rubber by the dimethylol phenol. In such cases, the desired limited or partial reaction can be carried out in a shorter time, or at lower temperatures, by using the organosulfonic acid as an accelerator in accordance with the invention. Thus, for example, the partial curing reaction between Butyl rubber and limited amounts of dimethylol phenol, for example, 0.2 to 2.5 parts per 100 parts of Butyl rubber, carried out at temperatures of 200°–400° F. for an inversely related period of time from 5–45 minutes, can be effectively accelerated by the presence of a small amount (say 0.5–2% on the weight of the rubber) of organosulfonic acid as described. Butyl rubber partially cured with dimethylol phenol and the process of making the same are disclosed in more detail and claimed in copending application Serial No. 290,344, filed May 27, 1952, now Patent No. 2,702,287. Limited reaction of the Butyl rubber with the dimethylol phenol greatly increases the tolerance of the rubber for mineral oil, and as much as 50 parts of oil, per 100 parts of Butyl rubber, can be incorporated into the thus-modified Butyl rubber while still retaining good processing qualities. The mixture of Butyl rubber and oil can be compounded for vulcanization with any curatives suitable for Butyl rubber, and vulcanized under the usual conditions to provide a vulcanizate of good physical properties. If carbon black is present during the limited reaction between the Butyl rubber and the dimethylol phenol, particularly at a temperature of 275°–400° F. for an inversely related time of about 5 to 30 minutes, and vulcanizing ingredients are thereafter incorporated and the mixture is vulcanized, it is found that the hysteresis of the vulcanizate is significantly lower than it would be if such pre-treatment were omitted. In any case, whether the improvement desired by the limited modification is increased oil tolerance or lower hysteresis, the accelerating method of the invention greatly facilitates attainment of the desired result by enhancing the Butyl rubber-dimethylol phenol reaction.

EXAMPLE V

This example illustrates the modification of Butyl rubber to increase its compatibility with oil, by reacting it with relatively small amounts of a dimethylol phenol, first without employing any accelerator (Table V–a), then with a sulfonic acid added as accelerator according to my invention (Table V–b).

The degree of chemical modification of the elastomer is indicated by the changes in Mooney viscosity, percent of gel, and swelling index of the gel.

Table V–a

|  | V-A | V-B | V-C | V-D | V-E |
|---|---|---|---|---|---|
| GRI-18 | 100 | 100 | 100 | 100 | 100 |
| Amberol ST-137 | 2 | 2 | 2 | 2 | 2 |
| Temperature of reaction [1] ° F | 350 | 350 | 350 | 350 | 350 |
| Time of reaction [1] minutes | 5 | 10 | 20 | 30 | 60 |
| Mooney viscosity (ML-4 212° F.) | 78 | 94 | 107 | 94 | 71 |
| Percent gel | 0 | 18 | 51 | 46 | 33 |
| Swelling Index |  | 121 | 44 | 44 | 73 |

[1] Reaction carried out in a size "B" Banbury (2 pounds' capacity), rotor speed 50 R. P. M.

Table V–b

|  | V-F | V-G | V-H | V-J |
|---|---|---|---|---|
| GRI-18 | 100 | 100 | 100 | 100 |
| Amberol ST-137 | 2 | 2 | 2 | 2 |
| p-Toluenesulfonic acid | 1 | 1 | 1 | 1 |
| Temperature of reaction ° F | 350 | 350 | 350 | 350 |
| Time of reaction minutes | 5 | 10 | 20 | 30 |
| Mooney viscosity (ML-4 212° F.) | 122 | 122 | 123 | [1] 119 |
| Percent gel | 76 | 72 | 72 | 76 |
| Swelling Index | 21 | 27 | 29 | 24 |

[1] Modified Butyl converted to a crumb.

The data of Table V–b, when compared to those of Table V–a, clearly show the definite accelerating action of the organosulfonic acid. Without acceleration, the maximum changes observed were associated with a reaction time of 20 minutes, after which the Butyl rubber begins to break down. With acceleration, the reaction occurs almost instantaneously, or after mixing only 5 minutes at 350° F., and the properties of the product remain remarkably constant over a wide range of heating time: i. e., there is a very marked "plateau effect." The degree of modification of the rubber in my process is far greater than the maximum observed with the unaccelerated compound. Stocks modified in this manner are well adapted for admixture therewith of considerable quantities of oils, as much as 50 parts of mineral oil per 100 of Butyl rubber being readily assimilated.

EXAMPLE VI

When the modification reaction, as described in Example V–b, is carried out in the presence of carbon black, the carbon black enters into the reaction, in some manner not fully understood, and one obtains stocks of unusually low torsional hysteresis and high electrical resistivity. This reaction is greatly accelerated by the addition of as little as 1% of an organosulfonic acid (on the weight of the Butyl rubber), as shown by the data below (Table VI). Table VI illustrates the effect of carbon black, and the greater degree of reaction obtained with the accelerator of the invention present. The chemicals shown in Table VI, Part 1 were blended on a roll mill with the GR–I, and with the black when called for, and then milled in a Banbury for about 20 minutes at 350° F. (50 R. P. M.). Thereafter, the vulcanizing and other compounding ingredients shown in Part 2, including the black when called for, were added on a roll mill, and each of the stocks was then milled in a Banbury for 5 minutes at 225° F. (20 R. P. M.).

Table VI

PART 1

|  | VI-A | VI-B | VI-C | VI-D | VI-E |
|---|---|---|---|---|---|
| GRI-15 | 100 | 100 | 100 | 100 | 100 |
| Spheron #6 |  |  | 50 | 50 |  |
| ST-137 | 1.5 | 1.5 | 1.5 | 1.5 |  |
| p-Toluenesulfonic acid |  | 0.5 |  | 0.5 |  |
| Light mineral oil | 10 | 10 | 10 | 10 | 10 |
| ML-4, 212° F | 65 | 68 | 55 | 54 | 32 |

Table VI—Continued
PART 2

|  | | | | | |
|---|---|---|---|---|---|
| Spheron #6 | 50 | 50 | | | 50 |
| ZnO | 5 | 5 | 5 | 5 | 5 |
| Tuex | 1 | 1 | 1 | 1 | 1 |
| MBTS | 1 | 1 | 1 | 1 | 1 |
| Sulfur | 2 | 2 | 2 | 2 | 2 |
| Stearic Acid | 1 | 1 | 1 | 1 | 1 |
| Final ML-4, 212° F | 79 | 93 | 49 | 48 | 55 |

| | Cures at 50#, minutes | | | | | |
|---|---|---|---|---|---|---|
| Scott Tensile | 45 | 2,180 | 2,070 | 2,410 | 2,430 | 2,080 |
|  | 60 | 2,110 | 2,020 | 2,390 | 2,380 | 2,210 |
|  | 75 | 2,050 | 2,150 | 2,440 | 2,450 | 2,290 |
| Elongation at break | 45 | 540 | 470 | 580 | 480 | 640 |
|  | 60 | 510 | 420 | 540 | 440 | 630 |
|  | 75 | 470 | 420 | 530 | 440 | 620 |
| Modulus at 300% Elongation | 45 | 1,000 | 1,080 | 880 | 1,200 | 550 |
|  | 60 | 1,000 | 1,240 | 990 | 1,330 | 650 |
|  | 75 | 1,080 | 1,280 | 1,050 | 1,380 | 680 |
| Log Elec. Resist | 45 | 6.9 | 6.6 | 8.6 | >13.0 | 5.0 |
|  | 60 | 6.8 | 6.6 | 8.1 | >13.0 | 4.9 |
|  | 75 | 6.8 | 6.5 | 8.1 | >13.0 | 5.0 |
| Tort. Hyst. 280° F | 45 | .21 | .24 | .16 | .08 | .34 |
|  | 60 | .21 | .23 | .16 | .08 | .34 |
|  | 76 | .21 | .23 | .16 | .08 | .34 |

EXAMPLE VII

This example illustrates the fact that the acceleration by organosulfonic acids not only increases the degree of reaction, but also allows the reaction to proceed at a lower temperature and at an increased rate.

Table VII

|  | No Acceleration | | | | | Acceleration | | | | |
|---|---|---|---|---|---|---|---|---|---|---|
|  | A | B | C | D | E | A' | B' | C' | D' | E' |
| GRI-18 | 100 | 100 | 100 | 100 | 100 | 100 | 100 | 100 | 100 | 100 |
| MPC Black | 50 | 50 | 50 | 50 | 50 | 50 | 50 | 50 | 50 | 50 |
| Amberol ST-137 | 2 | 2 | 2 | 2 | 2 | 2 | 2 | 2 | 2 | 2 |
| p-Toluenesulfonic acid |  |  |  |  |  | 1 | 1 | 1 | 1 | 1 |
| Time of Reaction......minutes | 5 | 10 | 20 | 30 | 60 | 5 | 10 | 20 | 30 | 60 |
| Temperature of Reaction....°F | 350 | 350 | 350 | 350 | 350 | 300 | 300 | 300 | 300 | 300 |

PHYSICAL PROPERTIES AFTER ADDITION OF SULFUR AND ACCELERATORS, AND 60' CURE AT 298° F.

|  | A | B | C | D | E | A' | B' | C' | D' | E' |
|---|---|---|---|---|---|---|---|---|---|---|
| Scott Tensile | 2,880 | 2,990 | 2,980 | 2,900 | 2,700 | 2,980 | 3,150 | 2,940 | 3,020 | 2,870 |
| Elongation at break | 610 | 550 | 540 | 520 | 530 | 540 | 520 | 490 | 490 | 480 |
| Modulus at 300% Elong | 920 | 1,270 | 1,270 | 1,310 | 1,160 | 1,250 | 1,300 | 1,450 | 1,420 | 1,320 |
| Tors. Hyst. at 280° F | .20 | .12 | .10 | .10 | .10 | .11 | .082 | .076 | .068 | .072 |
| Log. of elec. resist | 7.3 | 9.2 | 10.0 | 11.0 | 12.0 | 10.7 | >13 | >13 | >13 | >13 |

It will be evident from inspection of the data of Table VII that, without acceleration, the maximum reaction (as measured by modulus, torsional hysteresis and electrical resistivity) is obtained in 30 minutes at 350° F. However, with acceleration according to my invention, a greater degree of reaction is realized in one third of the time, at a temperature fifty degrees lower, viz., in 10 minutes at 300° F.

EXAMPLE VIII

In Table VIII are compared a low-hysteresis stock with a control Butyl tread stock. The ingredients indicated under Part 1 were compounded on a mill and then further mixed in a Banbury for 10 minutes at 325° F. The ingredients indicated under Part 2 were then added on a mill, following which the stocks were cured for 60 minutes at 298° F.

Table VIII
PART 1

|  | IX-A | IX-B |
|---|---|---|
| GRI-15 | 100 | 100 |
| MPC Black | 50 | 50 |
| Amberol ST-137 | 2 |  |
| p-Toluenesulfonic acid | 1 |  |

Table VIII—Continued

PART 2

| | | |
|---|---|---|
| Zinc Oxide | 5 | 5 |
| Stearic Acid | 1 | 1 |
| MBT | 0.5 | 0.5 |
| Tuex | 1 | 1 |
| Sulfur | 2 | 2 |

CURES 60' AT 50#

| Properties: | | |
|---|---|---|
| Scott Tensile | 2,350 | 2,100 |
| Elongation at break | 400 | 430 |
| Modulus at 300% Elong | 1,650 | 1,325 |
| Tors. Hyst. at 280° F | .0577 | .271 |
| Log. of Elect. Resist | 12.5 | 6.0 |

The data of Table VIII indicate that, in addition to exhibiting higher modulus, the resol-treated stock had unusually low torsional hysteresis and high electrical resistivity.

EXAMPLE IX

In the previously described low-hysteresis stocks the final cures were effected by using sulfur plus accelerators. This, however, is not necessary. Good cures may be obtained by using a dimethylol phenol as the final curing agent, with an organosulfonic acid as accelerator. In Table IX data are given for a low-hysteresis Butyl stock processed 15 minutes at 300° F. with two parts of Amberol ST–137 and 1 part of mixed aliphatic sulfonic acids. The stock was cured 30 minutes at 307° F. (60 lbs. steam). This compares favorably with a standard sulfur cure of 60 minutes at 298° F. (50 lbs. steam).

Table IX

| | A | B | C (Control) |
|---|---|---|---|
| GRI-15 | 100 | 100 | 100 |
| MPC Black | 50 | 50 | 50 |
| Amberol ST-137 | 2 | 2 | |
| p-Toluensulfonic acid | | 1 | |
| Mixed Alkanesulfonic acids | 1 | | |
| Banbury Temperature °F | 300 | 325 | 325 |
| Time of reaction minutes | 15 | 10 | 10 |

| | D | E | F |
|---|---|---|---|
| Stock A | 153 | | |
| Stock B | | 153 | |
| Stock C | | | 150 |
| Amberol ST-137 | 8 | | |
| Mixed alkanesulfonic acids | 1 | | |
| Zinc oxide | | 5 | 5 |
| Stearic acid | | 1 | 1 |
| Accelerators | | 1.5 | 1.5 |
| Sulfur | | 2.0 | 2.0 |
| Cure | 30' at 307° | 60' at 298° | 60' at 298° |
| Scott Tensile | 2,140 | 2,350 | 2,100 |
| Elongation at break | 440 | 400 | 430 |
| Modulus at 300% Elong | 1,150 | 1,650 | 1,325 |
| Tors. Hysteresis at 280° F | .099 | .0577 | .271 |
| Log of Elect. Resist | 12.31 | 12.5 | 6.0 |

The data show the attainment of low hystersis by the process of the invention, in a stock which, without my treatment, has a very high hysteresis.

The improved vulcanizates of the invention can be used to great advantage in making a variety of useful articles, such as curing bags of the various known kinds, either for new tires or for re-treading tires, as well as in making hose, belts, inner tubes, especially heavy service inner tubes, and pneumatic tires, especially tire treads and side walls, as well as other objects.

Having thus described my invention, what I claim and desire to protect by Letters Patent is:

1. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol and from 0.3 to 15 parts of an organosulfonic acid selected from the group consisting of aliphatic and aromatic sulfonic acids, at a temperature of 200–400° F., for a period of time of from 5 minutes to 3 hours inversely related to the temperature.

2. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol resol and from 0.3 to 15 parts of an organosulfonic acid selected from the group consisting of aliphatic and aromatic sulfonic acids, at a temperature of 200–400° F., for a period of time of from 5 minutes to 3 hours inversely related to the temperature.

3. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol resol and from 0.3 to 15 parts of an aliphatic sulfonic acid, at a temperature of 200–400° F., for a period of time of from 5 minutes to 3 hours inversely related to the temperature.

4. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol resol and from 0.3 to 15 parts of an aromatic sulfonic acid, at a temperature of 200–400° F., for a period of time of from 5 minutes to 3 hours inversely related to the temperature.

5. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol resol and from 0.3 to 15 parts of an alkane sulfonic acid, at a temperature of 200–400° F., for a period of time of from 5 minutes to 3 hours inversely related to the temperature.

6. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubber copolymer in admixture with from 0.2 to 20 parts of a 2,6-dimethylol-4-hydrocarbon substituted phenol resol and from 0.3 to 15 parts of p-toluenesulfonic acid, at a temperature of 200–400° F., for a period of time of from 5 minutes to 3 hours inversely related to the temperature.

7. A method of modifying a rubbery copolymer of an isomonoolefin having from 4 to 7 carbon atoms with from 0.5 to 10% of a conjugated diolefin having from 4 to 14 carbon atoms comprising heating 100 parts of the said rubbery copolymer in admixture with from 0.2 to 20 parts of a 2,6-dimethylol-4-hydrocarbon substituted phenol resol and from 0.3 to 15 parts of beta-naphthalenesulfonic acid, at a temperature of 200–400° F., for a period of time of from 5 minutes to 3 hours inversely related to the temperature.

8. A method of vulcanizing a rubbery copolymer of a conjugated diolefin having from 4 to 6 carbon atoms with an isomonoolefin having from 4 to 7 carbon atoms, said copolymer containing from 0.5 to 10% of said diolefin, comprising heating the said copolymer with from 2 to 20% of a 2,6-dimethylol-4-alkyl phenol resol and from 0.3 to 15 parts of an organosulfonic acid selected from the group consisting of aromatic and aliphatic sulfonic acids at a temperature of 200–400° F., for a period of time of from 5 minutes to 3 hours inversely related to the temperature.

9. A method of vulcanizing a rubbery copolymer of isoprene and isobutylene containing from 0.5 to 5% of isoprene, comprising heating the said copolymer with from 2 to 20% of a 2,6-dimethylol-4-alkyl phenol resol and from 0.3 to 15 parts of p-toluenesulfonic acid, at a temperature of 200–400° F., for a period of time of from 5 minutes to 3 hours inversely related to the temperature.

10. The method of modifying a rubbery copolymer of an isomonoolefin having from 4 to 7 carbon atoms with from 0.5 to 10% of a conjugated diolefin having from 4 to 14 atoms which comprises heating the said rubbery copolymer with from 0.2 to 2.5% of a 2,6-dimethylol-4-hydrocarbon substituted phenol and with a small amount, effective to accelerate the reaction of the said rubbery copolymer and the phenolic material, of an organosulfonic acid selected from the group consisting of aliphatic and aromatic sulfonic acids at a temperature of 200–400° F. for an inversely related period of from 5 to 45 minutes, and thereafter incorporating in the reaction product up to 50 parts of mineral oil per 100 parts of the said rubbery copolymer, and vulcanizing ingredients, and vulcanizing the mixture.

11. The method of producing a rubbery copolymer of an isomonoolefin having from 4 to 7 carbon atoms with from 0.5 to 10% of a conjugated diolefin having from 4 to 14 carbon atoms and carbon black vulcanizates of low torsional hysteresis which comprises heating the said rubbery copolymer containing a relatively large amount of rubber-reinforcing carbon black with from 0.2 to 2.5%, on the weight of rubber, of 2,6-dimethylol-4-hydrocarbon-phenol, and with a small amount, effective to accelerate the reaction of the rubber with the phenolic material and the carbon black, of an organosulfonic acid selected from the group consisting of aliphatic and aromatic sulfonic acids, at a temperature of 275–400° F. for an inversely related time of about 5 to 30 minutes, and thereafter incorporating in the product vulcanizing ingredients, and vulcanizing the mixture.

References Cited in the file of this patent

UNITED STATES PATENTS 2,649,431     Little _____ Aug. 18, 1953

FOREIGN PATENTS 492,906     Great Britain _____ Sept. 29, 1938

OTHER REFERENCES

Serial No. 357,662, Wildschut (A. P. C.), published April 20, 1943.